United States Patent [19]

Noack et al.

[11] 4,256,606
[45] Mar. 17, 1981

[54] ARRANGEMENT FOR THE THERMAL REGENERATION OF CHARGED ACTIVE COKE OR ACTIVE CARBON GRANULATE

[75] Inventors: Rolf Noack; Stefan Gramelt, both of Oberhausen, Fed. Rep. of Germany

[73] Assignee: Deutsche Babcock Aktiengesellschaft, Oberhausen, Fed. Rep. of Germany

[21] Appl. No.: 12,033

[22] Filed: Feb. 14, 1979

[30] Foreign Application Priority Data

Mar. 6, 1978 [DE] Fed. Rep. of Germany ....... 2809567

[51] Int. Cl.³ .................... B01J 20/34; C01B 31/08; F27B 1/08
[52] U.S. Cl. .................................. 252/411 R; 55/74; 55/79; 252/411 S; 432/77
[58] Field of Search ............... 252/411 R, 411 S, 418, 252/420; 55/73, 74, 79; 423/244

[56] References Cited

U.S. PATENT DOCUMENTS

| 1,784,536 | 12/1930 | Pantenburg | 252/411 R |
| 1,836,301 | 12/1931 | Bechthold | 55/79 |
| 4,179,399 | 12/1979 | Lichtemberger et al. | 252/411 R |

FOREIGN PATENT DOCUMENTS 48-7188  3/1973  Japan .......................................... 55/73

Primary Examiner—P. E. Konopka
Attorney, Agent, or Firm—Max Fogiel

[57] ABSTRACT

A process for thermal regeneration of charged activated coke or activated carbon granulate, in which the granulate is preheated in a preheating zone, and is then heated in a heating zone of a traveling bed by direct contact with a heated stream in the form of a partial stream of desorption gas expelled from the granulate. The granulate is then cooled in a cooling zone immediately after leaving the heating zone. The preheating and cooling procedures are carried out by using a heat exchange medium which is separate from the heated stream in the heating zone.

9 Claims, 2 Drawing Figures

ARRANGEMENT FOR THE THERMAL REGENERATION OF CHARGED ACTIVE COKE OR ACTIVE CARBON GRANULATE

BACKGROUND OF THE INVENTION

The present invention relates to a process and an associated apparatus for the thermal regeneration of charged active coke or active carbon granulate, in which the granulate is heated within a heating zone in a travelling bed through direct loading by a heated partial stream of the expelled desorption gas.

A good heat transfer is attained in this process through the direct contact between the granulate and the heating gas. It is, however, disadvantageous that the desorption gas for its heating is diluted through the supply of a hot foreign gas and must therefore be concentrated before its further processing. Although the dilution is somewhat reduced by blowing a partial stream of the desorption gas after heating into the heating zone. Large volume streams must, however, be heated in this case.

It is also known how to regenerate activated carbon through indirect heating. Since the activated carbon in this case does not come into contact with the heating medium, a dilution of the desorption gas is avoided. On the other hand, the heat transfer is too unfavorable in this process.

The invention therefore again turns to the initially named process. It has the object of developing this process further in such a manner that the volume of the gaseous heating medium guided through the granulate heap is kept as small as possible.

SUMMARY OF THE INVENTION

This problem is solved according to the present invention by preheating the granulate immediately before the entry into the heating zone and cooling it immediately after the exit from the heating zone and employing a heat exchange medium separate from the medium flowing through the heating zone.

The amount of heat, which must be supplied to the heating zone through the heating medium, is lowered through the preheating of the granulate so that smaller volume streams are required. This means that the degree of dilution can be lowered when using a foreign gas. At the same time, care is also taken through the gas side separation of the preheating and cooling zone from the heating zone that no foreign gas gets from any other source into the desorption gas.

It is advantageous when the granulate in the preheating zone and in the cooling zone is guided through vertical channels and when the heat exchange medium is guided externally around these channels. Hereby, a secure separation of the gas atmosphere of this zone relative to the heating zone is attained. At the same time, a good heat transfer is still possible because of the relatively short paths between the heated walls and the individual granulate grains.

To improve the heat balance, an improved embodiment of the invention provides that the heat exchange medium is at first guided through the cooling zone and subsequently through the preheating zone. In this manner, the heat withdrawn through cooling again comes to benefit the granulate in the preheating zone.

The partial stream of the desorption gas can be heated by adding a hot gas generated in a combustion chamber before the entry into the heating zone. To keep the degree of dilution small, the combustion in the combustion chamber is performed nearly stoichiometrically and the hot gas is admixed to the desorption gas practically at flame temperature.

The heating of the partial stream of the desorption gas can also be undertaken by heating this partial stream of the desorption gas indirectly in a heat exchanger through the combustion gases of a combustion chamber, by supplying these combustion gases after leaving the heat exchanger to the preheating zone and by supplying the cool air flowing through the cooling zone as combustion air to the combustion chamber. A dilution is avoided entirely. The combustion takes place with an increased excess of air, where the heat exchange medium flowing through the cooling zone and the preheating zone is included in the heating of the desorption gas for an improvement of the heat balance.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
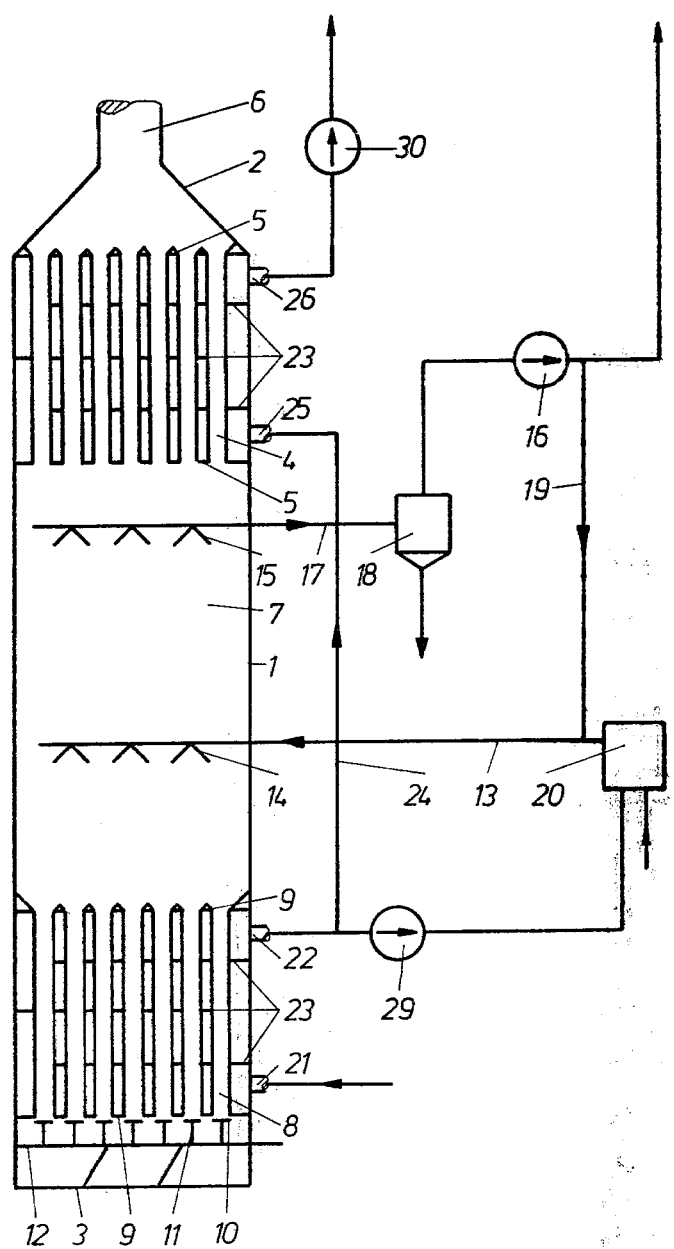
FIG. 1 shows a longitudinal section through an apparatus according to the invention with a flow diagram for the guidance of the heat exchange medium.

The illustrated desorber serves for desorbing and/or regenerating of active carbon or active coke granulate charged with sulphur dioxide or other injurious substances from the flue gas desulphurization. It consists of a housing with vertical side walls 1, a head 2 constructed as hood and a bottom 3.

The housing in the upper part is traversed by vertical channels 4, through which the granulate to be treated trickles downwardly. In the present case, the channels are formed by pipes arranged at a spacing from one another. The intermediate space remaining free between the channels 4 is closed off towards the head 2 and towards the interior of the desorber through a respective metal closure plate 5. Cones are placed between adjacent channels 4 on the upper metal closure plate 5. These cones guide the granulate supplied through the inlet opening 6 in the head 2 of the desorber into the channels 4.

No channels are provided in the middle part 7 of the desorber. The granulate issuing from the channels 4 wanders through this middle part 7 as travelling layer. Channels 8, which in construction and arrangement correspond to the channels 4 in the upper part, are provided in the lower part of the housing.

A respective metal closure plate 9 seals the space between the channels 8 and the side walls 1 from to the middle part 7 and from the bottom 3. Arranged underneath each of these channels 8 is a removal device, through which the granulate is carried out in a controlled manner. The removal device expediently consists of a catching plate 10, which is arranged at a small spacing below each channel 8 and on which the granulate accumulates in piles. The catching plates 10 are carried by leaf springs 11 or linkage rods. The leaf springs 11 are connected with a thrust linkage 12, which is, for example, transversely displaceable through an eccentric. Upon actuation of the thrust linkage 12, the catching plates 10 are displaced out of their middle position, while the heaped granulate slides over the edge of the catching plate 10. The granulate removed from the channels 8 is carried away through an output device in the bottom 3 and employed anew for adsorption of injurious substances from waste gases.

The cross-sectional shape of the channels 4 and 8 can be as desired. Their shape and the spacing of two opposite walls arising therefrom results from the requirement that, for one thing, the free trickling of the granulate shall not be hindered by bridge formation and that the mean spacing of a granulate grain from the heated wall may not be too great. In the present case, tubes with an inside diameter of 90 to 130 millimeters are employed with a maximum grain diameter of 9 millimeters.

To bring the granulate to the temperature necessary for the desorption, a gaseous heating medium of about 550° C. is blown through a duct 13 into the middle part 7 of the desorber. The duct 13 is connected with roof-shaped components 14, which pass through the housing of the desorber transversely and which are open downwardly. The heating medium rises upwardly in counterflow to the travelling direction of the granulate and heats it. The desorption gases expelled during heating are caught through roof-shaped components 15 together with the heating medium at a temperature of 300° C. and drawn off with the aid of a fan 16 through the duct 17 connected with the roof-shaped components 15. A dust precipitator 18 in the dust 17 takes care of the separation of entrained dust. The mixture of desorption gas and heating medium is fed to a further processing step.

The middle part 7 of the desorber represents the heating zone. The generation of the heating medium blown into the heating zone can take place by feeding back a partial stream of the desorption gas through the duct 19. In that case, purely by computation, the quantity of the desorption gas carried in the cycle is greater than the quantity of gas which is expelled through the heating of the granulate. An inert hot gas is admixed to the partial stream before the entry into the heating zone. The hot gas is obtained in a gas heater 20 through nearly stoichiometric combustion of a gaseous fuel with air. This hot gas is fed into the duct 13 at flame temperature together with the partial stream of the desorption gas from the duct 19.

Two stubs 21 and 22 are connected to the lower part of the housing which is traversed by the channels 8 and represents the cooling zone. A gaseous cool heat exchange medium, for example air at ambient temperature, is guided through the stub 21 into the space externally of the channels 8. The medium flows through the space under multiple deflection at the metal deflecting plates 23 and in this manner cools the granulate trickling through the channels 8. The heated heat exchange medium, after leaving the cooling zone, is blown via a duct 24 through the inlet stub 25 into the upper part of the housing which represents the preheating zone. It flows through the space externally of the channels 4 while delivering heat to the granulate. The heat exchange medium is subsequently delivered to the surroundings as waste air through the outlet stub 26.

When using air as heat exchange medium, a partial stream of the medium leaving the cooling zone can also be fed as combustion air to the gas heater 20.

Figure 2:
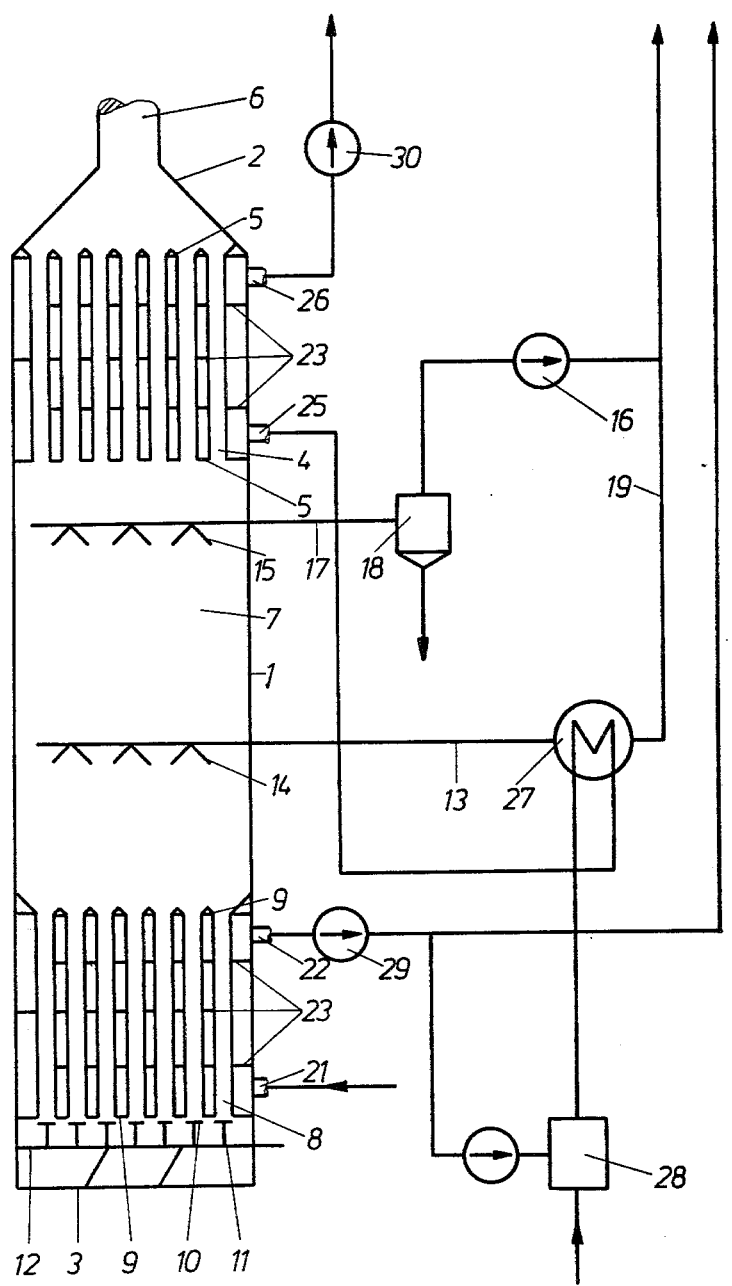
FIG. 2 shows a longitudinal section through an apparatus with a flow diagram according to another embodiment.

According to FIG. 2, the partial stream of the desorption gas is heated in directly in a heat exchanger 27. The heat exchanger 27 is loaded with flue gas from a combustion chamber 28. The combustion in the combustion chamber 28 is adjusted by excess of air so that the flue gases enter the heat exchanger 27 at a temperature of about 800° C.

The cooling air at a temperature of about 250° C. leaving the cooling zone through the stub 22 in the lower part of the desorber is for the largest part fed as combustion air to the combustion chamber 28. The cooling air not required is blown off. The flue gas, which after leaving the heat exchanger 27 displays a temperature of about 400° C., is inserted in the preheating zone through the entry stub 25 in the cutting part of the desorber. The flue gas is given off as waste gas after the heat delivery to the granulate.

The heat exchange medium, which within the preheating zone and the cooling zone circulates around the channels 4 and 8 from outside, is sucked through this zone. For this, a respective fan 29 and 30 is arranged in each duct which connects to the outlet stubs 26 and 22. In this manner, the risk of a fire is to be counteracted, which could arise when the heat exchange medium containing oxygen is forced into the granulate heap upon rupture of a channel wall.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. A process for thermal regeneration of charged activated coke or activated carbon granulate, comprising the steps of: preheating the granulate in a preheating zone; heating the granulate in a heating zone of a travelling bed by direct contact with a heated stream comprising a partial stream of desorption gas expelled from the granulate; and cooling the granulate in a cooling zone immediately after leaving the heating zone, the steps of preheating and cooling each being carried out by using a heat exchange medium separate from the heated stream in the heating zone, said charged granulate being heated to desorption temperature in said heating zone by direct contact with a gaseous heat-exchange medium.

2. A Process as defined in claim 1, including the steps of guiding the granulate in the preheating zone and the cooling zone through substantially vertical channels; and guiding the heat exchange medium around said channels on the outside thereof.

3. A process as defined in claim 1 including the step of guiding said heat exchange medium first through the cooling zone and then through the preheating zone.

4. A process as defined in claim 1 and using air as heat exchange medium.

5. A process as defined in claim 1 including the step of mixing hot gas generated in a combustion chamber to the partial stream of the desorption gas before entry into the heating zone.

6. A process as defined in claim 5 including the step of supplying a partial stream of cool air leaving the cooling zone as combustion air to the combustion chamber.

7. A process as defined in claim 1 including the step of heating a partial stream of desorption gas indirectly in a heat exchanger with combustion gases of a combustion chamber; delivering said combustion gases after leaving said heat exchanger to the preheating zone; supplying cool air flowing through the cooling zone as combustion air to said combustion chamber.

8. A process as defined in claim 1, including the steps of guiding the granulate in the preheating zone and the cooling zone through substantially vertical channels; guiding the heat exchange medium externally around said channels, said heat exchange medium being guided first through the cooling zone and then through the preheating zone; using air as heat exchange medium; mixing hot gas generated in a combustion chamber to the partial stream of the desorption gas before entry into the heating zone, a partial stream of cool air leaving the cooling zone being supplied as combustion air to the combustion chamber, the partial stream of desorption gas being heated indirectly in a heat exchanger with combustion gases of the combustion chamber; delivering said combustion gases after leaving said heat exchanger to the preheating zone; and supplying cool air flowing through the cooling zone as combustion air to said combustion chamber.

9. A process as defined in claim 1 wherein said gaseous heat-exchange medium is blown into said heating zone through a duct at substantially 550° C., said duct being connected with roof-shaped elements passing through a housing of said heating zone transversely and being open downwardly, said heat-exchange medium rising upwardly in counterflow to traveling direction of the granulate and heating said granulate, desorption gas expelled from the granulate during heating being caught through roof-shaped components together with said heat-exchange medium at a temperature of substantially 300° C. and drawn off through said duct, and separting entrained dust in said duct by a dust precipitator.

* * * * *